United States Patent
Tiku

(10) Patent No.: US 7,305,626 B2
(45) Date of Patent: Dec. 4, 2007

(54) METHOD AND APPARATUS FOR DOM FILTERING IN UAPROF OR CC/PP PROFILES

(75) Inventor: Siddharth Tiku, Espoo (FI)

(73) Assignee: Nokia Corporation, Espoo (FI)

( * ) Notice: Subject to any disclaimer, the term of this patent is extended or adjusted under 35 U.S.C. 154(b) by 525 days.

(21) Appl. No.: 10/156,999

(22) Filed: May 28, 2002

(65) Prior Publication Data

US 2004/0254905 A1 Dec. 16, 2004

(51) Int. Cl.
*G06F 3/00* (2006.01)
*G06F 3/01* (2006.01)

(52) U.S. Cl. ........................ 715/745; 709/229
(58) Field of Classification Search ............... 715/745, 715/747; 709/219
See application file for complete search history.

(56) References Cited

U.S. PATENT DOCUMENTS

| | | | | |
|---|---|---|---|---|
| 5,798,759 | A * | 8/1998 | Dahl ........................... | 715/745 |
| 5,946,311 | A * | 8/1999 | Alexander et al. ...... | 370/395.53 |
| 6,020,883 | A * | 2/2000 | Herz et al. .................. | 715/721 |
| 6,044,376 | A * | 3/2000 | Kurtzman, II .............. | 707/102 |
| 6,167,441 | A * | 12/2000 | Himmel ....................... | 709/217 |
| 6,311,194 | B1 * | 10/2001 | Sheth et al. ................ | 715/505 |
| 6,405,030 | B1 * | 6/2002 | Suprunov .................... | 455/410 |
| 6,519,617 | B1 * | 2/2003 | Wanderski et al. ......... | 715/513 |
| 6,545,987 | B1 * | 4/2003 | Becher ........................ | 370/328 |
| 6,589,291 | B1 * | 7/2003 | Boag et al. ................. | 715/513 |
| 6,611,358 | B1 * | 8/2003 | Narayanaswamy ......... | 358/442 |
| 6,622,016 | B1 * | 9/2003 | Sladek et al. ............ | 455/414.1 |
| 6,690,402 | B1 * | 2/2004 | Waller et al. ................ | 715/850 |
| 6,721,805 | B1 * | 4/2004 | Bhagwat et al. ............ | 709/250 |
| 6,748,569 | B1 * | 6/2004 | Brooke et al. .............. | 715/523 |
| 6,760,046 | B2 * | 7/2004 | I'Anson et al. ............. | 715/746 |
| 6,791,581 | B2 * | 9/2004 | Novak et al. ............... | 715/744 |
| 6,816,895 | B2 * | 11/2004 | Andreakis et al. .......... | 709/219 |
| 6,822,663 | B2 * | 11/2004 | Wang et al. ................ | 715/854 |

(Continued)

OTHER PUBLICATIONS

Butler et al, "Current technologies for Device Independence", Apr. 4, 2001, HP Laboratories Bristol HPL-2001-83, pp. 1-28.*

(Continued)

*Primary Examiner*—Weilun Lo
*Assistant Examiner*—Steven B. Therlault
(74) *Attorney, Agent, or Firm*—Ware, Fressola, Van Der Sluys & Adolphson LLP

(57) ABSTRACT

A method by which an application (22a 21a) on an origin server (22), or any other intermediary entity in an end-to-end network architecture connecting a client device (20) to a content provider entity, provides content to the client device (20) adapted to the client device (20) based on profile information regarding the client device (20), characterized by: the application (22a 21a) providing a request (M3' M3") for the profile information and including in the request profile-reducing information for indicating only a subset of all the profile information; and a filter (22b' 21c) parsing the profile information based on the profile-reducing information, so as to provide as a response (M6' M6") the indicated subset of all the profile information. The invention provides a document object module (DOM) filtering language (DFL) and corresponding application DFL parser (22b' 21c) for determining the reduced profile information, given an indication of what profile information is needed by the application (22a 21a).

21 Claims, 4 Drawing Sheets

U.S. PATENT DOCUMENTS

| | | | | |
|---|---|---|---|---|
| 6,865,171 | B1* | 3/2005 | Nilsson | 370/338 |
| 6,981,062 | B2* | 12/2005 | Suryanarayana | 709/248 |
| 7,028,306 | B2* | 4/2006 | Boloker et al. | 719/310 |
| 2001/0010061 | A1* | 7/2001 | Matsumoto | 709/249 |
| 2001/0010685 | A1* | 8/2001 | Aho | 370/329 |
| 2001/0013088 | A1* | 8/2001 | Matsumoto | 711/135 |
| 2001/0037407 | A1* | 11/2001 | Dragulev et al. | 709/250 |
| 2001/0056497 | A1* | 12/2001 | Cai et al. | 709/230 |
| 2002/0002705 | A1* | 1/2002 | Byrnes et al. | 725/14 |
| 2002/0010740 | A1* | 1/2002 | Kikuchi et al. | 709/203 |
| 2002/0046295 | A1* | 4/2002 | Asai | 709/246 |
| 2002/0069263 | A1* | 6/2002 | Sears et al. | 709/218 |
| 2002/0073235 | A1* | 6/2002 | Chen et al. | 709/246 |
| 2002/0083157 | A1* | 6/2002 | Sekiguchi et al. | 709/219 |
| 2002/0138545 | A1* | 9/2002 | Andreakis et al. | 709/200 |
| 2002/0194388 | A1* | 12/2002 | Boloker et al. | 709/310 |
| 2003/0009567 | A1* | 1/2003 | Farouk | 709/229 |
| 2003/0028643 | A1* | 2/2003 | Jabri | 709/226 |
| 2003/0041100 | A1* | 2/2003 | Nilsson et al. | 709/203 |
| 2003/0110234 | A1* | 6/2003 | Egli et al. | 709/217 |
| 2003/0186722 | A1* | 10/2003 | Weiner | 455/558 |
| 2003/0200337 | A1* | 10/2003 | Jabri et al. | 709/246 |
| 2004/0034853 | A1* | 2/2004 | Gibbons et al. | 717/174 |
| 2004/0098669 | A1* | 5/2004 | Sauvage et al. | 715/513 |
| 2004/0122949 | A1* | 6/2004 | Zmudzinski et al. | 709/225 |
| 2004/0204073 | A1* | 10/2004 | Yanosy | 455/557 |
| 2004/0267900 | A1* | 12/2004 | Hoekstra et al. | 709/217 |

OTHER PUBLICATIONS

Butler et al, "Implementing content Negotiation using CC/PP and WAP UAProf", Apr. 7, 2001, HP Laboratories Bristol HPL-2001-190, pp. 1-16.*

Suryanarayana, Lalitha et al, "Ubiquitous WWW: Profiles for the situated web", May 2002, Proceedings of the eleventh international conference of the world wide web, pp. 200-209.*

Siddiqui, Bilal et al, "Implementing XPath for wireless devices", Jun. 5, 2002, http://www.xml.com/pb/a/2002/06/05/wirelessxpath1.html, pp. 1-6.*

W3C et al, "Composite Capability/preference Profiles (CC/PP): A user side framework for content negotiation" Jul. 27, 1999 pp. 1-10.*

Wap Forum et al, "WAG UAPROF: Wireless Application Group user Agent Profile Specification", 1999 Wireless application Protocol Forum. pp. 1-76.*

3rd Generation Partnership Project et al. (3GPP) "Technical Specifcation Groupp Terminals; Mobile Station Applicaiton Execution Environment (MExE) Functional Description Stage 2 Release 4", Dec. 2000 pp. 1-76.*

W3C.org et al. "Resource Description Framework (RDF) Model and Syntax Specification", Feb. 1999. pp. 1-47.*

W3C et al. "The Platform for Privacy Preferences 1.0 (P3P1.0) Specification", http://www.w3.org/TR/P3P/ April 2002.* http://jcp.org/aboutJava/communityprocess/final/jsr037/index.html, 2001.*

Composite Capabilities/Preference Profiles: Requirements and Architecture; W3C Working Draft Jul. 21, 2000; published on the Internet.

Capability Information Exchange in a WAP gateway; Siddarth Tiku; Helskinki University of Technology; Department of Computer Science and Engineering; Espoo, Finland; Feb. 15, 2000.

Document Object Model (DOM); W3C Architecture Domain; Philippe Le Hégaret; published on the Internet; Jun. 17, 2001.

WAG UAProf; Version Oct. 20, 2001; Wireless Application Protocol WAP-248-UAPROF-20011020-a; published on the Internet (at www.wapforum.org).

* cited by examiner

METHOD AND APPARATUS FOR DOM FILTERING IN UAPROF OR CC/PP PROFILES

FIELD OF THE INVENTION

The present invention pertains to how a server device provides content to a client device, and more particularly, how a server device adapts the content to the capabilities of the client device.

BACKGROUND OF THE INVENTION

The growth over the last few years in use of the World Wide Web (WWW) and the Internet by users using desktop computers has been followed by increasing use by users using mobile terminals, including wireless terminals, and, for wireless terminals, has led to the development of the wireless access protocol (WAP). Recently, new kinds of mobile devices such as pagers, cellular phones, and personal digital assistants (PDAs) all with some form of Internet browsing capability have been introduced and many more kinds of mobile devices with various browsing capabilities are under development. With so many so-called client devices (i.e. client devices of servers providing content over the Internet) of such diverse browsing capability (many with very limited capability compared to desktop computers), a server of content, called here an origin server, must take into account the sometimes limited browsing capability of a client device so that the content that is provided is appropriate for the client device in that it can be rendered intelligibly.

While there are means to tailor the content for a client device by transforming the content so that it is appropriate for the client device, before a server can carry out such a content transformation, it must know the capability of the browser hosted by the client device.

CC/PP is a WWW Consortium (W3C) working draft that addresses the exchange between a client device and an origin server of information about the browser capability of the client device asking for Content from the origin server. The browser capability information so provided is called Capability Preference Information (CPI). (See Composite Capabilities/Preference Profiles: Requirements and Architecture; W3C Working Draft 21 Jul. 2000; at http://www.w3.org/TR/CCPP-ra/ on the World Wide Web.) The so-called WAP Forum has come out with a corresponding standard, the so-called UAProf (User Agent Profile) standard, that addresses the same issues in the wireless environment. UAProf has additionally defined the capability information vocabulary specific to wireless environments and transport protocols to be employed for communicating the capability information. However, UAProf is seamlessly interoperable with CC/PP. (See the User Agent Profile specifications made available at http://www.wapforum.org/what/technical.htm on the World Wide Web.) The goal of the CC/PP framework is to specify how client devices or intermediary network elements express their capabilities and preferences (the user agent profile) to the server that originates content (the origin server). The origin server uses the "user agent profile" to produce and deliver content appropriate to the client device. In addition to computer-based client devices, particular attention is paid to other kinds of devices, such as mobile phones.

The basic problem that the CC/PP framework addresses is to create a structured and universal format for how a client device tells an origin server about its user agent profile. CC/PP provides a high level mechanism for communicating profile information and profile difference information (relative to a default profile). However, CC/PP is protocol independent, and leaves open the issue of transport protocol. The CC/PP framework describes a standardized set of CC/PP attributes, i.e. it provides a vocabulary that can be used to express a user agent profile in terms of capabilities of the client device, and also to express the user's preferences for the use of the capabilities. The framework makes use of the XML (Extensible Markup Language) application RDF (Resource Description Framework) Model and Syntax Specification for the purpose of defining client capability information. Both XML and the RDF Model and Syntax Specification are provided by W3C. This enables the framework to be flexible, extensible, and decentralized. RDF is used to express the client device's user agent profile. The client device may be a workstation, personal computer, mobile terminal, or set-top box. When used in a request-response protocol like HTTP, the user agent profile is sent to the origin server which, subsequently, produces content that satisfies the constraints and preferences expressed in the user agent profile. The CC/PP framework may be used to convey to the client device what variations in the requested content are available from the origin server. Fundamentally, the CC/PP framework starts with RDF and then overlays a CC/PP-defined set of semantics that describe profiles. The CC/PP framework specifies the RDF usage and associated semantics that should be applied to all profiles that are being exchanged.

In the wireless environment, to accommodate client devices of varying capability, various UAProf-aware elements in the WAP end-to-end architecture, such as a WAP gateway element, an HTTP Proxy element, a PPG (push proxy gateway) element, an origin server element, and a PI (push initiator) element, can perform value-added content transformation (to tailor the content to the intended client device) and then send the transformed content to the WAP client. In order to make content transformation decisions for a WAP client, the elements rely on the CPI provided to the elements by the WAP client via the UAProf or CC/PP protocol.

According to the prior art, when a UAProf (or CC/PP profile) aware client device sends (UAProf or CC/PP profile) capability profile information (i.e. a reference to the CPI for the device) to a content transformation entity/ content adaptor in the WAP end-to-end architecture, the CPI contains a superset of capability information needed by the content transformation entity; the CPI contains, for example, information on the client device hardware, software, the browser used by the client device, networking, and WAP characteristics of the client device.

As an example, consider a simple content adaptor situated on the WAP gateway providing content to a WAP client, content provided typically over the Internet by an origin server distinct from the WAP client. Since the WAP client does not understand HTML (hypertext markup language) but only WML (wireless markup language), the primary function of the gateway content adaptor here is to perform HTML to WML conversion. In order to provide a pleasant visual appearance on the client device, the gateway content adaptor needs to know about the so-called WML deck size (a parameter indicating the maximum amount of data in bytes that a WAP client is capable of receiving for WML browsing) the client device supports. Based on the WML deck size, the gateway content adaptor can split translated HTML content requested from the origin server by the WAP client device into smaller decks so that the content appears properly when seen on the requesting WAP client device, including having proper forward and backward navigation hyperlinks. The deck size is provided by the UAProf attribute named WmlDeckSize. Therefore, the adaptor needs to access the UAProf profile for the requesting WAP client device. Even though the adaptor needs to know only a single attribute, it has to parse the full UAProf profile, which might contain more than three dozen attributes.

A client provides a reference to the full CPI since it does not know what specific information is needed by the content transformation entity/content adaptor. Once a content adapter has received an RDF profile (or its URL), it can use an XML parser to compile a so-called document object model (DOM) object for the capability profile, i.e. an expression of the RDF in XML. Since a CPI typically contains a large number of attributes, the corresponding DOM object occupies a correspondingly large amount of memory in the content adapter. A full DOM tree for a client device, i.e. a DOM tree 10 corresponding to the full UAProf profile for a client device, not tailored to only what is needed by the content adaptor, is shown in FIG. 1A. The UAProf profile/DOM tree includes a root element 10a. The root element might contain one or more component elements 10b (such as WAPCharacteristics and TerminalHardware), which can themselves have one or more attributes 10c (such as the number of pixels of the video screen in two orthogonal directions, indicated by the UAProf attribute named Screen-Size), indicated as the leafs of the DOM tree 10. FIG. 1B illustrates what a reduced DOM tree 11 derived from the DOM tree 10 of FIG. 1A, i.e. the DOM tree 10 after being pared down (or filtered) so as to include only the attributes 10c needed by a content adaptor. For the gateway content adaptor discussed above, the DOM tree in FIG. 1B would be even further pared down to provide a further reduced DOM tree, containing a root node, one intermediate node corresponding to WAPCharacteristics, and one leaf node representing the 'WmlDeckSize' attribute.

If a full DOM object/tree were to be used once and discarded, the waste of memory would be bad enough, but DOM objects are often cached in memory for faster response in handling subsequent requests. Even if it is assumed that there are only about a hundred different UAProf profiles (covering different terminals or terminal variants), caching of the DOM objects for such a number of UAProf profiles would consume a huge amount of memory resources of the content adaptor. Additionally, the time to access a particular UAProf attribute in the full DOM tree for a client device would most likely be more than the access time for the same attribute in a filtered tree, i.e. a tree pared down to what is actually needed by the content adaptor/content transformation entity, because with a full DOM tree, some time is likely to be wasted in browsing through sibling nodes while searching for a particular attribute. Thus, the use of a full CPI/full DOM object/tree results in larger memory requirements and increases the response time needed by a content adaptor for getting UAProf attributes for a client device from a DOM object.

FIG. 2 shows the context for a scenario in which a WAP client device 20 provides CPI to an origin server 22 via a RAN 21 including a WAP gateway 21a, in accord with the prior art in the situation in which only the origin server (and not also the WAP gateway) adapts content requested by the WAP client device. In the scenario, the client device 20 first sends a message M1, communicated using WSP, requesting content from the origin server 22; the message M1 includes either a reference to the profile/CPI for the WAP client device 20 (i.e. by providing a URL for the profile) or includes a reference to a default profile and indicates the difference in the CPI for the client device 20 compared to the default profile. The request is received by the RAN (radio access network) element 21, and more specifically by the WAP gateway 21a. When the WAP gateway receives the request and the profile reference (message M1), it passes the request on to the proxy cache 21b, which then provides the request (as message M2) to the application 22a on the origin server 22. When the application 22a receives the message M2, it formulates a query based on the profile reference and passes the query (as message M3) to an XML parser 22b. The XML parser 22b then communicates the query (as message M4) to a CC/PP profile repository 24 (perhaps at least in part via the World Wide Web if the CC/PP profile repository 24 is connected to the Internet). (It is assumed here that an XML parser is capable of automatically downloading an XML file from the Internet, since the XML file must be downloaded before the XML parser can initiate parsing the XML into the DOM form. If the XML parser is not able to download by itself, then the application 22 a would have to download the profile directly, meaning that message M3 would flow from 22a to the profile repository 24 and as a result of this, application 22a would directly receive the profile. Next, the application 22a would invoke the XML parser 22b, passing it the previously downloaded profile and the parser would return (as in a called function returning a value) to the application 22a the DOM tree corresponding to the XML.)

In response to the message M4, the CC/PP repository in turn provides the requested profile information (as message M5); the profile information so provided corresponds to a full DOM tree, and so includes, in general, more information about the WAP client 20 than is needed by the application 22a to tailor its content to the WAP client 20. When the XML parser 22b receives the complete profile information for the WAP client, it parses it so as to provide a full DOM tree, and provides the full DOM tree to the application 22a (as message M6).

It is important to understand the difference between message M5 and message M6. The message M5 is a HTTP response message with the body of the message containing profile in the RDF text format. When the XML parser 22b receives the RDF(XML) text as message M5, it parses the text and starts building a tree object out of the various elements and attributes present in the RDF. Once the full DOM tree has been compiled (built), the XML parser 22b passes it back to the application 22a as message M6.

Then, the application 22a of the origin server (in message M7) provides a response, using HTTP, including the requested content, but adapted to the WAP client device 20; the proxy cache 21b receives the adapted content and provides it to the WAP gateway element 21a, which then sends the adapted content (as message MB) to the WAP client device 20 using WSP.

The prior art also allows for the WAP gateway to interface with an XML parser so as to obtain a full DOM tree for the client device 20 and so also tailor content (provided by the origin server 22 or provided by itself). In addition, the prior art allows for having only a WAP gateway interfacing with an XML parser to adapt content, instead of having an XML parser interfacing with the application 22a to adapt content either alone or in combination or in addition to a WAP gateway interfacing with an XML parser.

To address the problem of wasting memory resources by using a full DOM tree, the prior art teaches using DOM tree post processing, and, alternatively, using a global hash table. (A dictionary in which keys are mapped to array positions by a so-called hash function.) In DOM post processing, once an XML parser has parsed the RDF profile into a DOM object/tree, post processing is performed to remove at least some of the extra nodes/leafs of the DOM tree (i.e. the attributes) by making use of the DOM interface. (The W3C DOM specification provides a language and platform independent interface for accessing or manipulating XML content. A DOM parser is used to compile a DOM tree 10 (FIG. 1A) corresponding to an XML document. Each node or leaf 10c in a DOM tree is represented by a number of DOM interfaces, like 'Node,' which is quite generic. The different interfaces allow operations such as accessing, adding, deleting and modifying the various nodes, making it possible to prune a DOM tree. For More information about DOM, refer to http://www.w3c.org/DOM/)

A variant of the DOM tree post processing approach is to reduce the RDF/XML to desired form using XSLT (extensible stylesheet language, transformation part), a specification for converting a document from one type/schema to another, consisting of a set of rules that describe exactly how and where a piece of content in a first document type should appear in a second document type, rules that are described in XML themselves, or in other words, a language for specifying how to transform an XML document of one type to another type. After the XLST processing is complete, an XML parser is invoked to compile the reduced RDF into the DOM object.

Another implementation approach that can be adopted by content adaptors is to use selected attributes in a hash table. In this approach, the RDF profile is first parsed into a (normal) DOM tree object. Then the relevant UAProf attributes are retrieved and added to a global hash table or to an individual hash table corresponding to a given profile. The hash table is used thereafter, instead of the DOM tree.

The above implementations are all in accord with the CC/PP framework and UAProf specification, because the CC/PP framework and UAProf specification describe the transport, format and attribute vocabulary for a CPI but leave open how to read and update profiles, i.e. how an entity inside a WAP end-to-end chain reads and updates profiles is not specified. However, when an entity communicates with another entity, the communicated profile must be in RDF format to be in accord with the CC/PP framework and UAProf specification.

What is needed is a more efficient mechanism for providing, for a client device, a DOM object/tree including only the attributes needed by an origin server, or any other intermediary element that serves as content adaptor, in providing content to the client device.

SUMMARY OF THE INVENTION

Accordingly, in a first aspect of the invention, a method is provided by which an application hosted by an entity responsible for content adaptation, adapts content requested by a client device so as to be suitable for display by the client device based on profile information regarding the client device, characterized by: the application providing a request for the profile information and including in the request profile-reducing information for indicating a subset of the profile information; and a filter parsing the profile information based on the profile-reducing information, so as to provide as a response the indicated subset of all the profile information.

In accord with the first aspect of the invention, the filter may be based on an extensible markup language (XML) parser enhanced to respond to an XML-based filtering language having a syntax and semantics suitable for indicating instructions to the enhanced XML parser in parsing the profile information based on the profile-reducing information. Also in accord with the first aspect, the application and the filter may be both hosted by an origin server. Also in accord with the first aspect, the application and the filter may be both hosted by an element of a network.

In a second aspect of the invention, a method is provided by which an application responsible for content adaptation adapts content requested by a client device so as to be suitable for display by the client device, the adapting being based on profile information regarding the client device, characterized by the application communicating to a filter profile-reducing information according to a language based on an extensible markup language (XML) and having a syntax and semantics suitable for indicating instructions to the filter in parsing the profile information based on the profile-reducing information so as to make accessible to the application a subset of the profile information including substantially only the profile information needed by the application to adapt the content being provided to the client.

In a third aspect of the invention, a method is provided by which an entity communicates signals bearing profile-reducing information indicating a subset of all profile information characterizing a device, the method characterized in that the profile-reducing information is expressed according to a filtering language based on an extensible markup language (XML) and having a syntax and grammar suitable for indicating how to filter all the profile information characterizing the device so as to obtain the subset of all the profile information characterizing the device.

In accord with the third aspect, the filtering language may comprise elements and associated attributes and possible child elements, and the possible child elements may be for indicating syntax rules for the filtering language, and in addition, the grammar of the filtering language may be the grammar for XML. Further, the profile information may be provided as an XML document and the response indicating a subset of all the profile information may be provided as an output object, and in addition, the filtering language may include the elements and attributes set out in the following table:

| Element | Attributes | Possible Child elements |
| --- | --- | --- |
| domfilter | — | match |
| match | elem, [mode = full | selective] | [hasChild], [include], [attrmatch] |
| hasChild | elem, [child = direct | grandchild] | [include], [attrmatch] |
| attrmatch | name, value | — |
| include | — | add |
| add | name | — | in which optional quantities are indicated using rectangular brackets, and alternatives are indicated using a vertical bar; in which a 'domfilter' element serves as a root element in the filtering language and contains one or more 'match' elements; in which a 'match' element describes an element in the XML document that must be included in the output object, subject to some conditions, and may contain one or more 'hasChild' elements and may also contain an 'include' element as a child, and in addition has an 'elem' attribute and may also have a 'mode' attribute, with the 'elem' attribute identifying the element to be filtered and having a subtree starting from the element, and the 'mode' attribute for specifying whether to include the entire subtree starting from the element or whether to include only selected elements; in which an 'attrmatch' element, having 'name' and 'value' attributes, can be present as a child element of the 'match' element and as a child element of a 'hasChild' element and is used for specifying the 'name' and 'value' attributes to be matched; in which the 'include' element lists various elements that if present in the XML document as the direct descendants of the matched element must be included in the output object, and which may have an 'add' element as a child element; and in which the 'add' element, having a 'name' attribute, specifies the elements that need to be selectively included in the output object.

In a fourth aspect of the invention, an origin server is provided, including an application and also including an application filter operative as the application and application filter of the first aspect of the invention, respectively.

In a fifth aspect of the invention, a network is provided including an application having content adaptation functionality, the network also including a filter, wherein the application and the filter are operative as the application and the filter of the first aspect of the invention, respectively.

In a sixth aspect of the invention, a system is provided including a client device and including an origin server (22) that in turn includes an application and a filter, and also including a network for connecting the client device to the origin server, wherein the application and the filter are operative as the application and the filter of the first aspect of the invention, respectively.

In a seventh aspect of the invention, a system is provided including a network that in turn includes an application and a filter, and also including a client device in communication with the network, wherein the application and the filter are operative as the application and the filter of the first aspect of the invention, respectively.

The invention thus provides an efficient mechanism, namely a smarter XML parser, for tailoring a CPI of a client device to the needs of a content transformation entity serving an origin server providing content to the client device. The XML parser of the invention retrieves CPI for the client device and customizes the CPI to the needs of the content transformation entity, such as a WAP gateway. The invention can be provided so as to be useable in either UAProf or CC/PP environment, provided the content transformation entity (content adaptor) makes use of DOM parsers for accessing the profiles.

Because the CC/PP framework and UAProf specification describe the transport, format and attribute vocabulary for a CPI but leave open how to read and update/ manipulate profiles, the invention, using DOM processing to read and then reduce DOM trees, is in accord with the CC/PP framework and UAProf specification.

BRIEF DESCRIPTION OF THE DRAWINGS

The above and other objects, features and advantages of the invention will become apparent from a-consideration of the subsequent detailed description presented in connection with accompanying drawings, in which.

BEST MODE FOR CARRYING OUT THE INVENTION

Figure 1B:
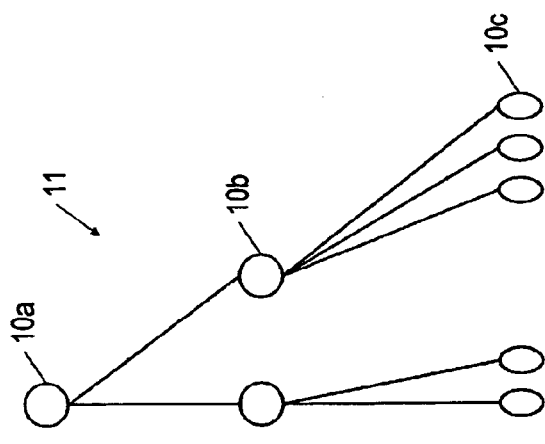
FIG. 1B is a schematic diagram illustrating a pared down tree diagram corresponding to a filtered document object model (DOM) conveying only profile information for a client device needed by a content adaptor in providing to the client device content from an origin server.
Figure 1A:
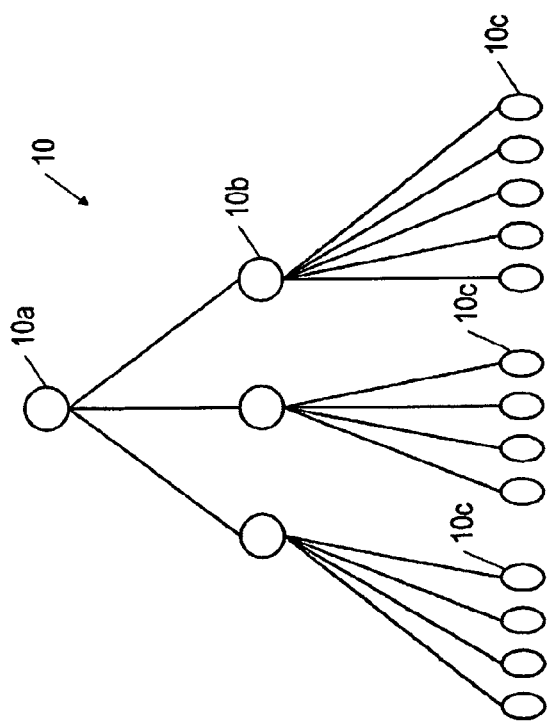
FIG. 1A is a schematic diagram illustrating a tree diagram corresponding to a full document object model (DOM) conveying all profile information for a client device.
Figure 2:
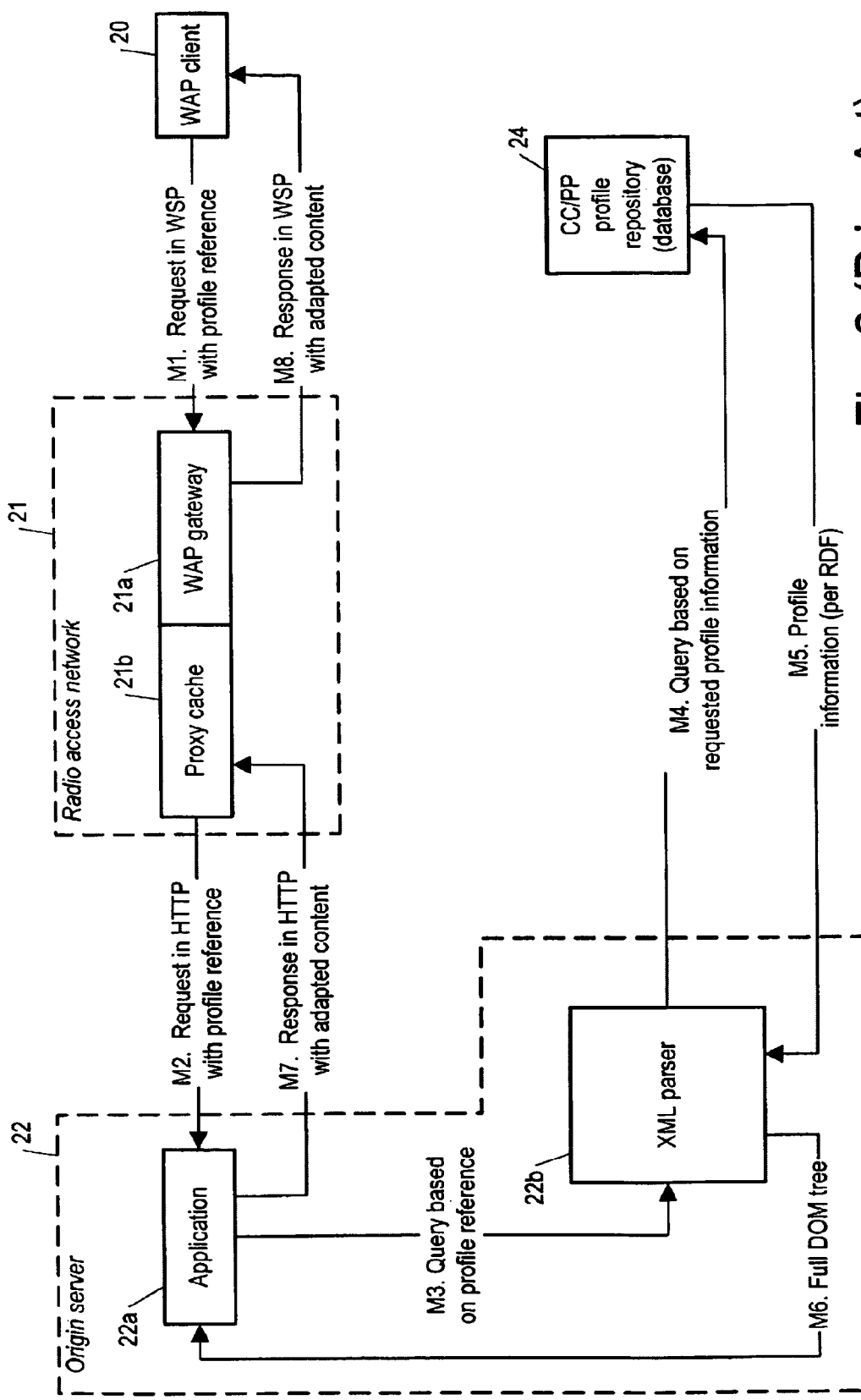
FIG. 2 is a block diagram with message data flows illustrating one scenario in which a wireless client device requests and receives content from an origin server via a WAP gateway, according to the prior art.
Figure 3:
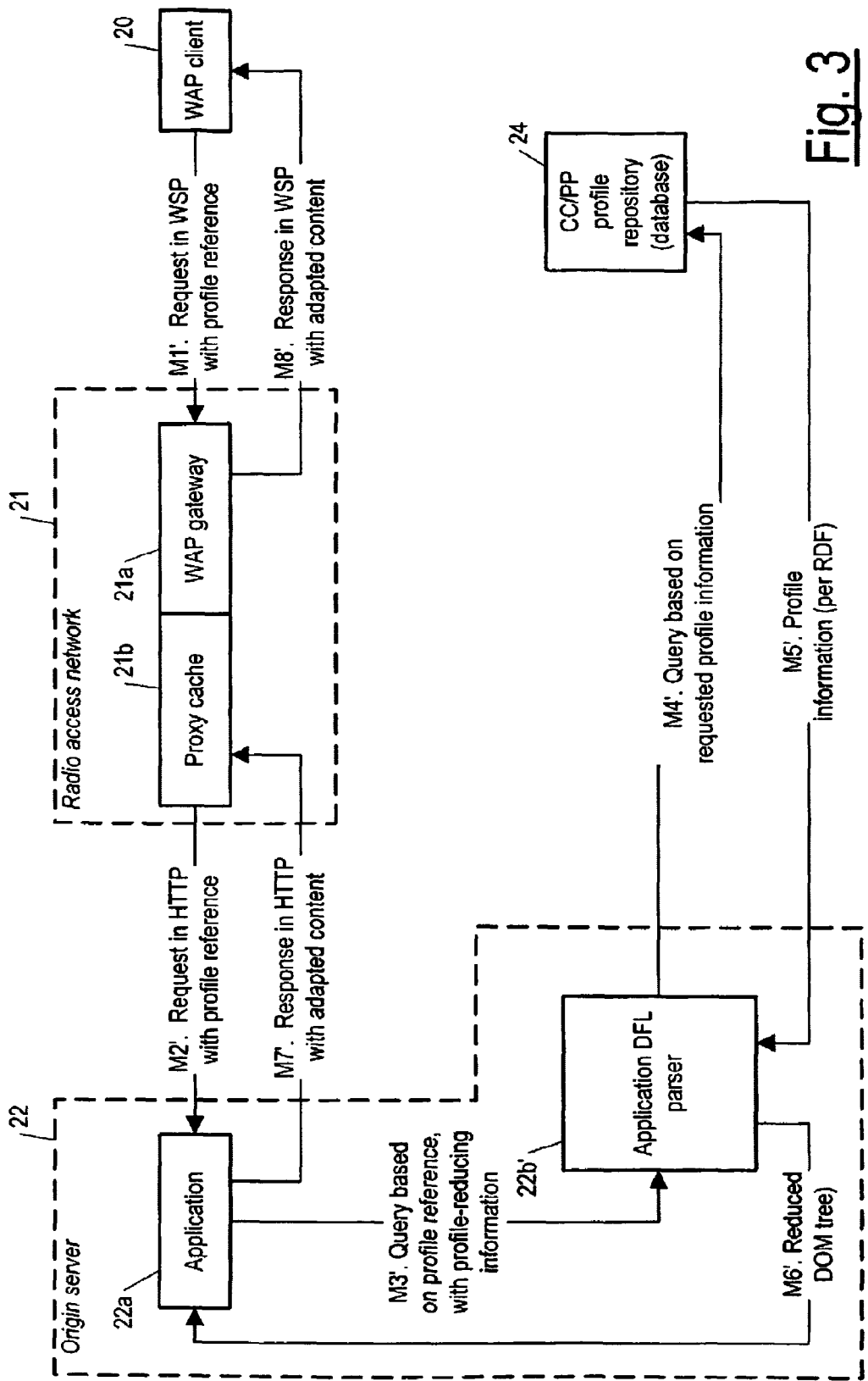
FIG. 3 is a block diagram with message data flows illustrating a scenario in which a wireless client device requests and receives content from an origin server, according to the invention.

Referring now to FIG. 3, the invention is shown in terms of a scenario in which, as in FIG. 2, the origin server 22 obtains CPI for the WAP client device 20 and tailors the CPI (reduces the extraneous profile information) to what the content server (more specifically, the particular application 22a of the content server) needs to adapt the content to the WAP client device 20. As in the prior art (as illustrated in FIG. 2), the client device 20 first sends a message M1', communicated using WSP, requesting content from the origin server 22; the message includes either a reference to the profile/CPI for the WAP client device 20 (i.e. by providing a URL for the profile) or includes a reference to a default profile and indicates the difference in the CPI for the client device 20 compared to the default profile. The request is received by the RAN (radio access network) element 21, and more specifically by the WAP gateway 21a. When the WAP gateway receives the request and the profile reference (message M1'), it passes the request on to the proxy cache 21b, which then provides the request (as message M2') to the application 22a on the origin server 22. When the application 22a receives the message M2', it formulates a query based on the profile reference and passes the query along with profile-reducing information (as message M3') to an application DOM filtering language (DFL) parser 22b'. The profile-reducing information indicates the profile information the application 22a needs to know in order to tailor/adapt its content to the WAP client 20. The application DFL parser 22b' is associated with the application 22a and able to use the profile-reducing information to provide a reduced DOM tree, containing only the information needed by the application 22a to adapt the requested content to the requesting WAP client device 20. When the application DFL parser 22b' receives the request M3', it communicates the query (as message M4') to the CC/PP profile repository 24 (perhaps at least in part via the World Wide Web if the CC/PP profile repository 24 is connected to the Internet).

In response to the message M4', the CC/PP repository in turn provides the requested profile information (as message M5'); the profile information so provided corresponds to a full profile, and so includes, in general, more information about the WAP client 20 than is needed by the application 22a to tailor its content to the WAP client 20. When the application DFL parser 22b' receives the full profile information for the WAP client, it parses it so as to provide a reduced DOM tree, including ideally only what is needed by the application 22a for the WAP client 20, and provides the reduced DOM tree to the application 22a (as message M6').

Then, as in the prior art, the application 22a of the origin server (in message M7') provides a response, using HTTP, including the requested content, but adapted to the WAP client device 20; the proxy cache 21b receives the adapted content and provides it to the WAP gateway element 21a, which then sends the adapted content (as message M8') to the WAP client device 20 using WSP. Unlike in the prior art, in adapting its content for the WAP client 20, the application 22a has a smaller (reduced) DOM tree to search for the attributes relevant to performing the adaptation and so can perform the adaptation more quickly, and can store the reduced DOM tree using less memory than would be required to store a full DOM tree.

As indicated above, the application DFL parser 22b' is an XML parser that preferably is a "smart" XML parser in that it understands DFL (i.e. DOM filtering language), an XML-based language especially suitable filtering profile information encoded in XML.

The DOM filtering language includes pre-defined elements and associated attributes as set out in table 1. The attributes are indicated using conventional computer language syntax notation in which a square bracket indicates an optional quantity, and a vertical bar indicates an alternative.

TABLE 1

Pre-defined elements and associated attributes of the DOM filtering language.

| Element | Attributes | Possible Child elements |
|---|---|---|
| domfilter | — | match |
| match | elem, [mode = full \| selective] | [hasChild], [include], [attrmatch] |
| hasChild | elem, [child = direct \| grandchild] | [include], [attrmatch] |
| attrmatch | name, value | — |
| include | — | add |
| add | name | — |

The element 'domfilter' serves as a root element in the DFL. It contains one or more 'match' elements.

A 'match' element describes an element in the XML document that must be included in the output DOM, subject to some conditions. Whenever a DOM parser encounters a new element in the XML document during the parsing, it checks to see if there is a 'match' element associated with it in the profile-reducing information (in DFL). If one is found, it starts processing based on instructions in the 'match' element; otherwise it continues with normal processing. A 'match' element may contain one or more 'hasChild' elements, and a 'match' element may also contain an 'include' element as a child. The semantics of the 'include' element inside a 'hasChild' element implies that a grandchild of the element identified with the 'match' element needs to be included in the output DOM object. However, if the include element occurs as a child of the 'match' element, it is the child element of the matched element that needs to be included.

A 'match' element has associated with it a (required) 'elem' attribute and may also have an optional 'mode' attribute. The 'elem' attribute element identifies the element to be filtered, i.e. it identifies the element being matched, what is here called the matched element. The 'mode' attribute is applicable if the condition specified by the match and, optionally, 'hasChild' element, is true. If the condition is true, the 'mode' attribute specifies whether to include the entire subtree starting from the matched element or whether to include only selected elements. By default, the entire subtree starting from and including the element itself is included. If the mode is 'full,' then there should be no 'include' elements inside the match element hierarchy. Alternatively, the 'include' elements can be ignored. If only selected elements are to be included, there must be an 'include' element present, either as the child of the 'match' element or as the child of a 'haschild' element inside the 'match' element.

An 'attrmatch' element, having 'name' and 'value' attributes, can be present as a child element of a 'match' element. It is used for refining the filtering conditions further. If included, the attribute-value pair specified by 'name' and 'value' attributes should be present in the matched element in the XML, so that the matched element can be considered for inclusion in the output DOM tree. (The term 'matched element' is used here to refer to an element inside an XML document that is being referred to by the 'elem' attribute of a 'match' element.)

The 'haschild' element can be used to specify as a condition for filtering that the matched element has a child (or a grandchild). The 'hasChild' element can also have several associated attributes, one of which, an 'elem' attribute, is required and identifies the child element name. An optional child attribute can be used to indicate whether the specified child is a direct child of the matched element (child=direct) or a grandchild of the matched element (child=grandchild). The default value for the child attribute is the value direct. Additionally, (optional) attribute-value pairs can be specified by the 'attrmatch' element and used to refine the filtering condition. Since one or more 'hasChild' elements may be included within a single 'match' element, the DFL parser should start evaluating the first 'hasChild' element and then, only in case of failure, move to the next 'hasChild' element. This is very similar to the 'switch' statement common in programming languages like C++ and JAVA.

The attributes of the 'attrmatch' element are the attributes of the element of which it is a child element, either a 'match' element or a 'haschild' element. The 'attrmatch' is an empty element. There can be one or more 'attrmatch' elements present as a child of either a 'match' element or a 'hasChild' element. (The 'elem' attribute of the 'match' element and the 'haschild' element give the element to be matched, and the 'attrmatch' element gives the attributes to be matched.)

An 'include' element lists various elements that if present in the XML document as the direct descendants of the matched element must be included in the output DOM. As indicated in Table 1, an 'include' element may have an 'add' element as a child element.

An 'add' element, having a 'name' attribute, specifies the elements that need to be selectively included in the output DOM object. The element to be included is identified with the 'name' attribute. An 'add' is an empty element and there can be more than one 'add' element inside an 'include' element.

Following are two examples of providing profile-reducing information using DFL. (Familiarity with UAProf profiles is prerequisite for understanding the examples.) For the case where only a single UAProf attribute, namely the 'WmlDeckSize' attribute, is required by the application 22a to adapt its content for the client device 20, the DFL fragment could be:

```
<domfilter>
    <match elem="prf:component" mode="selective" >
        <hasChild elem="rdf:type" child="grandchild" >
            <attrmatch name="resource" value=
            "*WapCharacteristics" />
            <include>
                <add name="rdf:type"/>
```

-continued

```
            <add name="prf:WmlDeckSize"/>
        </include>
    </hasChild>
    </match>
</domfilter>
```

The above DFL fragment indicates that when a "prf:component" element is encountered in the XML document/full DOM tree by the DFL parser 21c, the DFL parser is to check whether the full DOM tree contains a "prf:component" element containing "rdf:type" as a grandchild node with the attribute "resource" having a value that contains the substring "WapCharacteristics" (the condition that "WapCharacteristics" need be only a substring being conveyed by using the wildcard character '*'). If the condition is met, then the "prf:component" component element is to be included in the reduced DOM tree and the subtree under it is also to be included selectively, which is conveyed by means of the attribute 'mode' having a value 'selected'. The elements that need to be selectively included are listed inside the "include" element.

If the condition is not satisfied, the DFL parser skips the entire tree branch starting from the "<prf:component>" and continuing up to and including the corresponding end tag, "</prf:component>". The 'include' element in the DLF fragment indicates that the component elements "rdf:type" and "prf:WmlDeckSize" are to be included in the reduced DOM tree, provided they are present as child elements of the "prf:component" in the full DOM tree. The rest of the UAProf properties, i.e. the rest of the full DOM tree, is ignored, i.e. it is not included in the reduced DOM tree. In a nutshell, this block of DFL statements result in a filtered DOM profile that contains only a single "WapCharacteristics" component having only attribute "prf:WmlDeckSize" and "rdf:type" elements in it.

The next example demonstrates a second DFL fragment, one that might be used when the whole subtree (of the full DOM tree) starting from a particular matching element is to be included in the reduced DOM tree.

```
<domfilter>
    <match elem="prf:component" >
        <hasChild elem="rdf:type" child="grandchild" >
            <attrmatch name="resource" value=
            "*HardwarePlatform" />
        </hasChild>
    </match>
</domfilter>
```

The second DFL fragment indicates that all the UAProf attributes (of the full DOM tree) occurring under the "HardwarePlatform" (i.e. hardware characteristics) component element are to be included, but not the rest of component elements. (Since the 'mode' attribute is not present in the 'match' element, by default the whole subtree is included.)

It should be understood that the invention builds on what is already present according to some prior art for adapting content to a WAP client. In particular, according to some prior art, an XML parser is already used, and the invention adds to such an XML parser the ability to understand and respond to DFL as described here, or an equivalent XML-based filtering language. By way of background, consider a content adaptor in a WAP end-to-end chain. Such a content adaptor receives a URL for a profile in a header of a message it receives. The content adaptor then downloads the profile, which is in RDF. An RDF profile is in text format. If the content adaptor wants to access the profile information in a tree-like fashion, it needs to invoke a parser. A DOM-based XML parser does exactly that: given an XML file, such a parser churns out a DOM tree as output. (So an XML parser is a pre-requisite for building a DOM tree.) A DPL parser, as used here, is an XML DOM parser that additionally understands the syntax and semantics of DFL.

According to the invention, the application DFL parser 22b' must know what the application 22a needs to know to adapt content for the WAP client 20. As indicated in FIG. 3, to arrange that the DFL parser 22b' has this information, the application 22a (FIG. 3) can pass the profile-reducing information (using either DFL as described here or an equivalent XML-based filtering language) to the application DFL parser 22b' (or some other functionally equivalent parser) by, for example, modifying the manner in which the application DFL parser is invoked (compared to how a simple XML parser would be invoked to provide a full DOM tree). In other words, if a simple XML parser would be invoked using a call such as Parse (File aProfile), the application DFL parser 20b would be invoked using a call such as Parse(File aprofile, File aDFL), where 'aProfile' is an RDF file for the full DOM tree, and 'aDFL' is a DFL markup indicating the profile-reducing information that the application 22a needs to pass on to the application DFL parser 22b'.

To create the DFL fragment conveying the profile-reducing information, the application 22a assembles DFL in simple text format to provide a DFL mark-up. Once the DFL mark-up is created, the application 22a creates a DOM tree out of the DFL, which can be done by invoking a (simple) XML parser or the application DFL parser 22b'. The DOM tree so created is a DFL DOM object. Although a simple DOM parser can be used to create the DOM tree indicating the profile-reducing information, to parse the profile information according to the profile-reducing information, a DFL-enabled/smart XML parser is needed.

Figure 4:
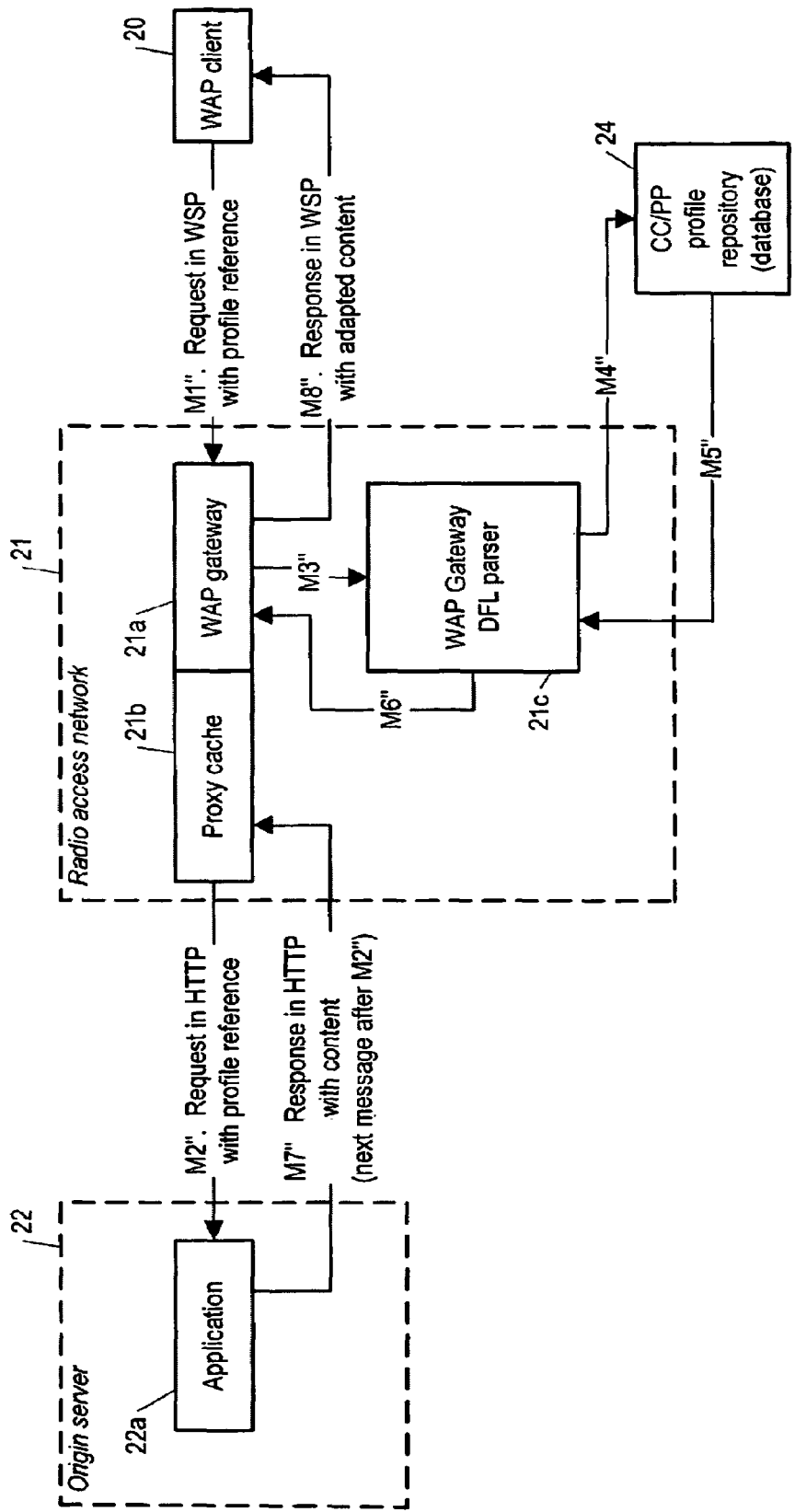
FIG. 4 is a block diagram with message data flows illustrating a scenario in which a wireless client device requests and receives content from an origin server according to an alternative embodiment of the invention.

Referring now to FIG. 4, an embodiment is shown in which instead of an application DFL parser 22b', as in the embodiment illustrated in FIG. 3, a WAP gateway DFL parser 21c is used to adapt content for the WAP client 20. Such an embodiment would be used in case of a WAP gateway providing content possibly associated with or complementary to the content provided by the origin server 22 or in case of the origin server 22 not providing content adaptation itself, and the WAP gateway instead having the responsibility to do so. In all such cases, the WAP gateway thus includes (or has access to) functionality for adapting content, functionality similar to the functionality for adapting content included in application 22a of the origin server 20.

The order of the messages shown in FIG. 4 is not as suggested by the message labels, because for clarity the message labels are kept similar to labels in the embodiment in FIG. 3 in respect to the kind of information conveyed by the messages and irrespective of the order; the order of the messages is M1", M2", M7", M3", M4", M5", M6", and M8". The messages M3", M4", M5", and M6" between the WAP gateway DFL parser 21c and the CC/PP repository 24 correspond to the messages M3', M4', M5', and M6' between the application DFL parser 22b' and the CC/PP repository 24. The message M3" includes gateway profile-reducing information, i.e. it indicates what profile information is needed by the gateway 21a to adapt the content to the client device 20.

Scope of the Invention

It is to be understood that the above-described arrangements are only illustrative of the application of the principles of the present invention. It is especially important to understand that the invention is applicable not only in a WAP environment (where UAProf is used in an exchange between a client device and an origin server of information about the browser capability of the client device asking for content from the origin server), but also in a general Internet (where CC/PP is used); nothing about the invention limits it to use with UAProf. Thus, the invention is of use when an origin server provides content to a client device that is not necessarily a WAP client device and may not require the use of a RAN to communicate with the origin server; the client device may communicate with the origin server via one or more networks, including in some cases both the Internet and a RAN. Numerous modifications and alternative arrangements may be devised by those skilled in the art without departing from the spirit and scope of the present invention, and the appended claims are intended to cover such modifications and arrangements.

What is claimed is:

1. A method by which an application hosted by an entity responsible for content adaptation, adapts content requested by a client device so as to be suitable for display by the client device based on profile information regarding the client device, comprising:
   the application providing a request for the profile information and including in the request profile-reducing information for indicating a subset of the profile information;
   a document object model filtering language filter parsing the profile information based on the profile-reducing information, so as to provide as a response the indicated subset of all the profile information; and
   the application using only the subset of the profile information in adapting the content so as to be suitable for display by the client device.

2. A method as in claim 1, wherein the filter is based on an extensible markup language parser enhanced to respond to an extensible markup language-based filtering language having a syntax and semantics suitable for indicating instructions to the enhanced extensible markup language parser in parsing the profile information based on the profile-reducing information.

3. A method as in claim 1, wherein the application and the filter are both hosted by an origin server.

4. A method as in claim 1, wherein the application and the filter are both hosted by an element of a network.

5. A method, comprising:
   an entity communicating signals bearing profile-reducing information indicating a subset of all profile information characterizing a device in order to perform a function dependent on the indicated subset of profile information; and
   using the indicated subset of all profile information instead of the entire set of all profile information in performing the function;
   wherein the profile-reducing information is expressed according to a filtering language based on an extensible markup language and indicates to a domain object model filtering language filter how to parse all the profile information characterizing the device so as to obtain the subset of all the profile information characterizing the device.

6. A method as in claim 5, wherein the subset of the profile information includes substantially only the profile information needed by the entity to adapt content provided to the device so as to be suitable for display by the device.

7. The method of claim 5, wherein the filtering language comprises elements and associated attributes and possible child elements, and wherein the possible child elements are for indicating syntax rules for the filtering language, and further wherein the grammar of the filtering language is the grammar for the extensible markup language.

8. The method of claim 5, wherein the profile information is provided as an extensible markup language document and wherein the subset of all the profile information is provided as an output object, and further wherein the filtering language includes the elements and attributes set out in the following table:

| Element | Attributes | Possible Child elements |
| --- | --- | --- |
| domfilter | — | match |
| match | elem, [mode = full | selective] | [hasChild], [include], [attrmatch] |
| hasChild | elem, [child = direct | grandchild] | [include], [attrmatch] |
| attrmatch | name, value | — |
| include | — | add |
| add | name | — | in which optional quantities are indicated using rectangular brackets, and alternatives are indicated using a vertical bar; in which a 'domfilter' element serves as a root element in the filtering language and contains one or more 'match' elements; in which a 'match' element describes an element in the extensible markup language document that must be included in the output object, subject to some conditions, and may contain one or more 'hasehild' elements and may also contain an 'include' element as a child, and in addition has an 'elem' attribute and may also have a 'node' attribute, with the 'elem' attribute identifying the element to be filtered and having a subtree starting from the element, and the 'mode' attribute for specifying whether to include the entire subtree starting from the element or whether to include only selected elements; in which an 'attrmatch' element, having 'name' and 'value' attributes, can be present as a child element of the 'match' element and as a child element of a 'hasChild' element and is used for specifying the 'name' and 'value' attributes to be matched; in which the 'include' element lists various elements that if present in the extensible markup language document as the direct descendants of the matched element must be included in the output object, and which may have an 'add' element as a child element; and in which the 'add' element, having a 'name' attribute, specifies the elements that need to be selectively included in the output object.

9. An origin server, including an application and also including an application filter operative as the application and application filter of claim 1, respectively.

10. A network including an application having content adaptation functionality, the network also including a filter, wherein the application and the filter are operative as the application and the filter of claim 1, respectively.

11. A system, including a client device and including an origin server that in turn includes an application and a filter, and also including a network for connecting the client device to the origin server, wherein the application and the filter are operative as the application and the filter of claim 1, respectively.

12. A system, including a network that in turn includes an application and a filter, and also including a client device in communication with the network, wherein the application and the filter are operative as the application and the filter of claim 1, respectively.

13. A content adaptation application for hosting by one or more servers, the content adaptation application for adapting content requested by a client device so as to be suitable for display by the client device based on profile information regarding the client device, comprising:

means for providing a request for the profile information and including in the request profile-reducing information for indicating a subset of the profile information; and a document object model filtering language filter for parsing the profile information based on the profile-reducing information, so as to provide as a response the indicated subset of all the profile information; and means for using only the subset of the profile information in adapting the content so as to be suitable for display by the client device.

14. An application for hosting by one or more servers, comprising:

means for communicating signals bearing profile-reducing information indicating to a document object model filtering language filter a subset of all profile information characterizing a device in order to perform a function dependent on the indicated subset of profile information; and means for using the indicated subset of all profile information instead of the entire set of all profile information in performing the function;

wherein the profile-reducing information is expressed according to a filtering language based on an extensible markup language and indicates how to filter all the profile information characterizing the device so as to obtain the subset of all the profile information characterizing the device.

15. An application as in claim 14, wherein the subset of the profile information includes substantially only the profile information needed by the application to adapt content provided to the device so as to be suitable for display by the device.

16. A method, comprising: responding to a request for profile information useful in adapting content for display, the request including profile-reducing information for indicating a subset of the profile information, by parsing the profile information based on the profile-reducing information and providing as a response the indicated subset of all the profile information.

17. The method of claim 16, wherein the profile-reducing information is expressed according to a filtering language based on an extensible markup language and indicates how to filter all the profile information characterizing the device so as to obtain the subset of all the profile information characterizing the device.

18. The method of claim 17, wherein the filtering language comprises elements and associated attributes and possible child elements, and wherein the possible child elements are for indicating syntax rules for the filtering language, and further wherein the grammar of the filtering language is the grammar for the extensible markup language.

19. An apparatus, comprising a processor configured via encoded instructions, for providing a document object model filtering language filter, responsive to a request for profile information useful in adapting content for display, the request including profile-reducing information for indicating a subset of the profile information, the filter for parsing the profile information based on the profile-reducing information and for providing as a response the indicated subset of all the profile information.

20. The apparatus of claim 19, wherein the profile-reducing information is expressed according to a filtering language based on an extensible markup language and indicates how to filter all the profile information characterizing the device so as to obtain the subset of all the profile information characterizing the device.

21. The apparatus of claim 20, wherein the filtering language comprises elements and associated attributes and possible child elements, and wherein the possible child elements are for indicating syntax rules for the filtering language, and further wherein the grammar of the filtering language is the grammar for the extensible markup language.

* * * * *

UNITED STATES PATENT AND TRADEMARK OFFICE
CERTIFICATE OF CORRECTION

| | | |
|---|---|---|
| PATENT NO. | : 7,305,626 B2 | Page 1 of 1 |
| APPLICATION NO. | : 10/156999 | |
| DATED | : May 28, 2002 | |
| INVENTOR(S) | : Siddharth Tiku | |

It is certified that error appears in the above-identified patent and that said Letters Patent is hereby corrected as shown below:

In column 14, line 34, claim 8, line 24, "hasechild" should be --hasChild--.

In column 14, line 36, claim 8, line 26, "node" should be --mode--.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,305,626 B2
APPLICATION NO. : 10/156999
DATED : December 4, 2007
INVENTOR(S) : Siddharth Tiku It is certified that error appears in the above-identified patent and that said Letters Patent is hereby corrected as shown below:

In column 14, line 34, claim 8, line 24, "hasechild" should be --hasChild--.

In column 14, line 36, claim 8, line 26, "node" should be --mode--.

This certificate supersedes the Certificate of Correction issued May 13, 2008.

Signed and Sealed this

Third Day of June, 2008

JON W. DUDAS
*Director of the United States Patent and Trademark Office*